July 18, 1933.　　　　　L. BREGUET　　　1,919,088
WING STRUCTURE FOR FLYING MACHINES
Filed Jan. 28, 1932　　2 Sheets-Sheet 1
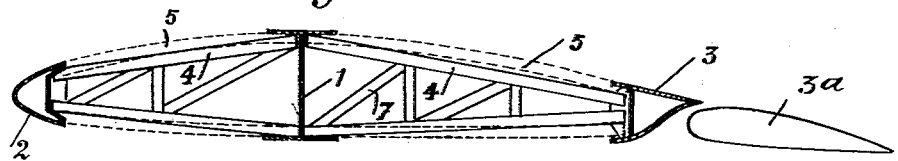
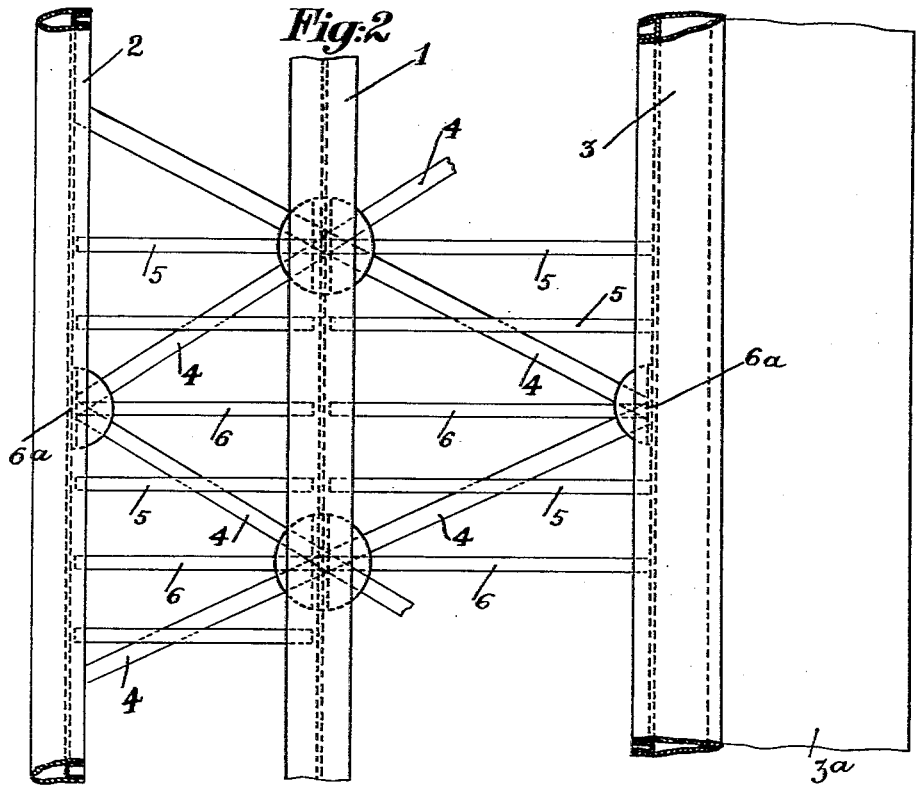
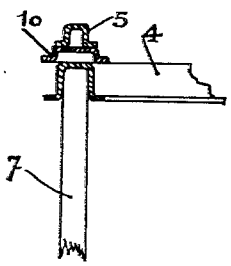
Inventor
Louis Breguet
By Mauro & Lewis
Attorneys July 18, 1933.  L. BREGUET  1,919,088
WING STRUCTURE FOR FLYING MACHINES
Filed Jan. 28, 1932  2 Sheets-Sheet 2
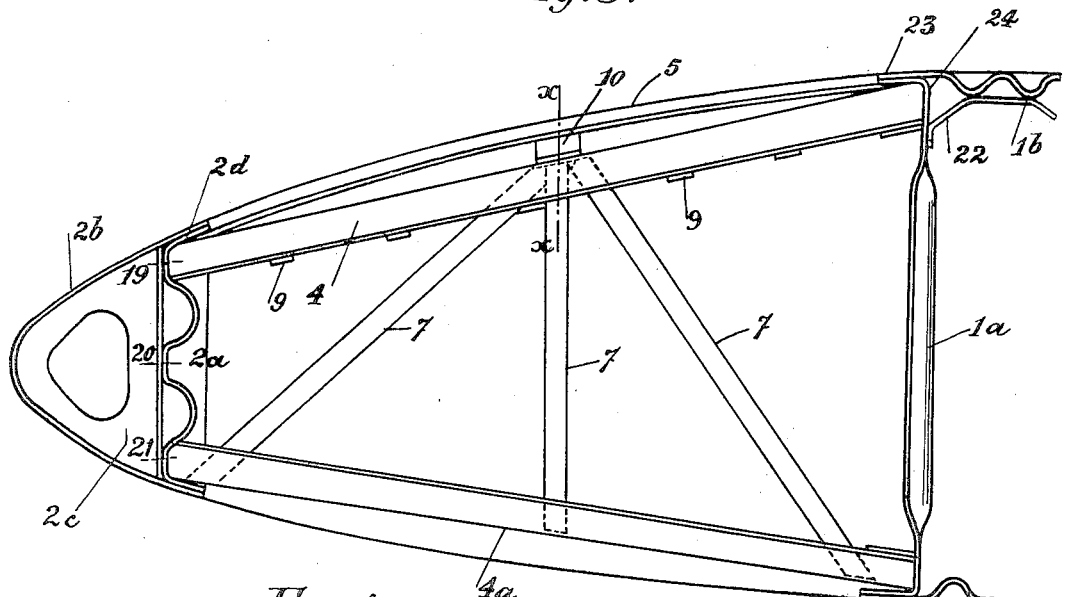
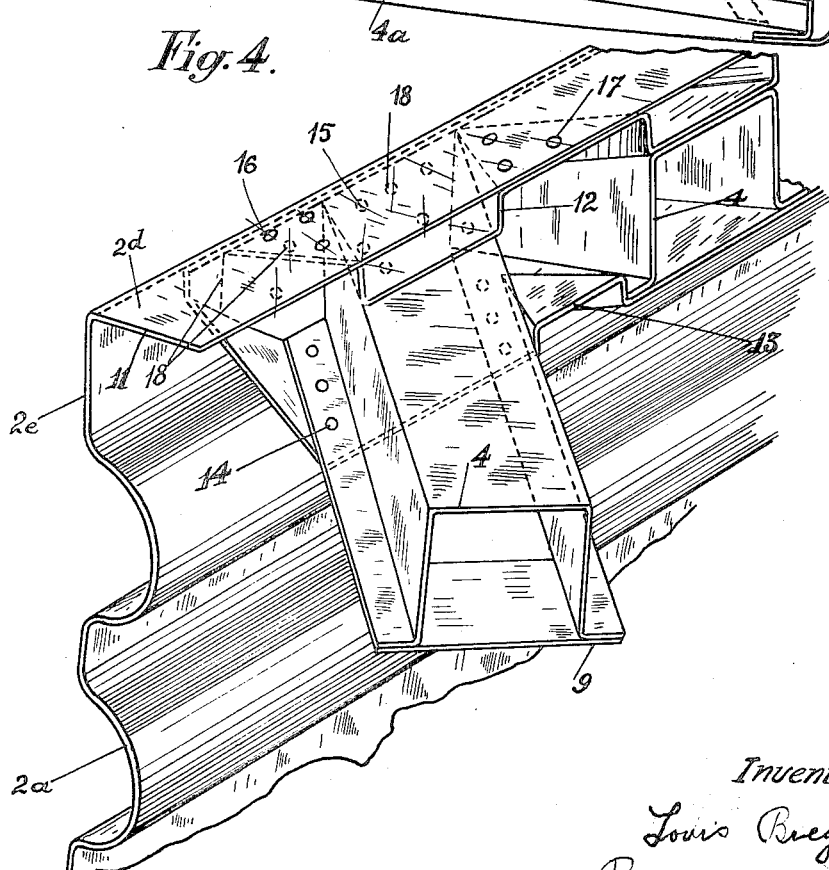
Inventor
Louis Breguet
By Mauro & Lewis
Attorney Patented July 18, 1933

1,919,088

UNITED STATES PATENT OFFICE

LOUIS BREGUET, OF PARIS, FRANCE, ASSIGNOR TO SOCIETE ANONYME DES ATELIERS D'AVIATION LOUIS BREGUET, OF PARIS, FRANCE, A COMPANY OF FRANCE

WING STRUCTURE FOR FLYING MACHINES

Application filed January 28, 1932, Serial No. 589,480, and in France March 25, 1931.

The most prevalent form of airplane wing structure, since aviation exists, comprises essentially two spars, disposed at right angles to the fore and aft direction of the airplane, and connected to each other through struts which form with said spars an orthogonal system which is braced by means of rigid or flexible diagonal members, such as tubes, wires or tie rods. That system is further provided with ribs which have a shape corresponding to the desired profile of the wing, and which are secured to said spars at regular intervals and at right angles thereto. The covering, of fabric, veneer, or sheet metal, surrounds the ribs to which it is secured. Lastly, the leading edge and the trailing edge consist of a special member of appropriate shape, such as a false spar, a sectional iron, or a cable.

That usual mode of construction has several drawbacks. The following drawbacks may be cited, among others:

(a) in wings the structure of which, consisting of spars and corresponding diagonal members, is braced by means of wires, cables or tie rods, the adjustment of the tension of these flexible organs is a rather delicate operation, which must be checked or made over again at periodical intervals;

(b) the two spars, which must be disposed as far apart as possible, in order to increase the rigidity of the truss that they form in the plane of the wing, are located at points of the profile of the wing where the thickness of said wing is relatively small, due to the proximity of the leading edge or of the trailing edge, which correspondingly reduces the height of said spars and their capacity of withstanding bending moments;

(c) the resultant of the aerodynamic actions to which the wing is subjected is materially displaced when the angle of incidence varies, so that the loads on the two spars of the wing are unequal and vary substantially with the conditions of flight;

(d) as above stated, the utilization of two spars does not avoid the necessity of employing accessory pieces in the form of spars or false spars for constituting the leading edge and the axis of articulation of the auxiliary surfaces or ailerons with which the wing is provided.

My invention relates to a new wing structure which avoids or lessens the above mentioned drawbacks and further provides some new advantages.

Preferred embodiments of my invention will be hereinafter described with reference to the accompanying drawings, given merely by way of example, and in which:

Fig. 1 is an elevational view diagrammatically showing the structure according to my invention;

Fig. 2 is a plan view corresponding to Fig. 1;

Fig. 3 is a sectional view of a practical embodiment, on a line parallel to the direction of a diagonal member 4 of Fig. 1;

Fig. 4 is a corresponding detail view at an enlarged scale;

Fig. 5 is a sectional view on the line $x$—$x$ of Fig. 3.

In the diagrammatical showing of Figs. 1 and 2, the wing structure according to my invention essentially comprises:

(a) a main spar 1, located at the point where the profile of the wing has a maximum thickness, that is to say at a distance from the leading edge of the wing substantially equal to one third of the chord of said wing;

(b) two secondary spars 2 and 3, which form respectively the leading edge of the wing and the rear edge of the fixed part of its profile. On said rear edge of the fixed part of the wing are pivoted the ailerons or auxiliary surfaces $3^a$, such as ailerons for the lateral control and surfaces for varying the curvature of the wing;

(c) oblique or diagonal and consecutive braces 4, which connect the main spar 1 to the secondary spars 2 and 3, each of said braces consisting of rigid pieces, so as to form a truss the constituents of which are disposed as close to the contour of the wing profile as it is possible;

(d) finally, light pieces 5, forming a light framework between main spar 1 on the one hand, and secondary spars 2 and 3 on the other hand. Said pieces 5 are disposed at right angles to the direction of the spars, that is to say in a parallel direction to the fore and aft direction of the airplane. When the covering of the wing is supple, said laths 5 extend over oblique braces 4 on the outer part of which they bear. Said laths serve to ensure the regular shape of the profile of the wing in a plane parallel to the fore and aft direction of the airplane and to secure the supple covering. When the covering is rigid, and, in particular, when it is metallic, the oblique braces 4 above described may conform exactly with the shape of the surface of the covering. In the latter case, laths 5, instead of being disposed upon said braces 4 are secured to the latter, while also conforming in shape to the surface of the covering, which is then secured both to oblique braces 4 and to laths 5.

Furthermore, I may dispose, between laths 5, and at the points 6a at which oblique braces 4 are secured to spars 2 and 3, intermediate laths 6, lighter than laths 5 and which only serve to maintain the regular shape of the wing profile for the covering which is secured to them. In the case, for instance of a covering of thin metallic plates, said intermediate laths play the part of an inner corrugation of the metal and serve to stiffen the latter for increasing the resistance of the covering to torsional stresses. Said intermediate laths are optional.

The wing thus formed constitutes a flat trussed box, braced in all directions by means of rigid pieces only, such a box being consequently not liable to get deformed.

Owing to the maximum height of the main spar, said structure utilizes remarkably well the matter of said spar for absorbing bending stresses and compressive stresses.

Owing to the fact that the leading edge and the rear edge of the fixed part of the wing profile consist of secondary spars, said parts are given a great rigidity and are efficiently utilized for absorbing compressive and bending stresses.

Owing to the maximum space existing between these two secondary spars, the structure according to my invention is better adapted to withstand the stresses resulting from head resistance which tend to bend the wing in its own plane.

Finally, owing to the bracing and trussing in all directions of the wing structure, by means of the oblique braces 4, and owing to the arrangement of the elements of the wing structure in such a manner that they are as close as possibly to the periphery of the wing, said structure is remarkably resistant to stresses tending to twist the wing about itself.

Furthermore, in the case of wings of so-called rectangular shape, or of wings of substantially equivalent shape, my invention makes it possible to utilize simple wing elements, identical from one portion of the wing to another one, and obtained by means of a simple equipment.

In the case of a wing made as above explained and braced by means of uprights and tie rods, the fixation of said uprights or tie rods to the structure of the wing may be made either on the main spar 1 according to the known means, or, also according to the known means, on the secondary spars 2 and 3, or on one of the last mentioned spars and on the main spar. In the two last cases, the secondary spar to which said bracing members are secured is connected to the main spar through a reinforced connection. Such a connection may consist, in particular, either of a box-shaped rib forming a direct bracing according to the known arrangements, or of the very oblique braces 4 above referred to, which are then suitably reinforced.

In order to better explain certain details of the wing construction according to my invention, I have shown in Figs. 3 to 5, by way of example, an embodiment of a wing structure of the type according to my invention.

Said example relates to the case of a wing having a supple covering and therefore to the case in which, as above stated, the covering is fixed only to laths 5 and 6 which are at right angles to the spars and serve to fix the profile of the wing, said laths bearing upon oblique braces 4 over which they are disposed.

The front spar consists of the web 2a provided with longitudinal corrugations so as to increase its resistance to compression and to buckling, and of a sheet forming the leading edge proper, web 2a and sheet 2b being maintained by means of transverse pieces 2c made of sheet iron, suitably stamped and hollowed out, which are regularly spaced along the leading edge of the wing and the rectilinear vertical edge of which serves to fix, at 19, 20, and 21, web 2a and to ensure its resistance to transverse shearing.

The main spar 1 consists of two webs such as 1a, corrugated in the transverse direction, and assembled to two treads 1b which may be longitudinally corrugated, webs 1a being then braced from place to place by means of gussets such as 22 or of spaced frames.

Besides, in a general manner, the main spar may be constructed in any way whatever, the only necessary characteristic of my invention concerning said construction being that the treads of said spar are part of the profile of the wing, and that braces 4 and laths 5 and 6 are secured to said spar on the upper and lower outer portions thereof.

The oblique braces 4 (Figs. 1 and 3) form, together with uprights or rods 7, a vertical truss. Said braces consist of sectional irons, such as U-shaped irons with flanged edges (Fig. 4) closed at certain places by means of small plates 9 secured to the flanges of said irons. Bracing rods 7 may, for example, consist of U-shaped sectional irons inserted inside braces 4, as shown in Fig. 5, and which are secured through known means, and in particular through riveting, with the adjunction of an assembling gusset, if need be.

Laths 5 are secured to the whole of beam 4 and bracing rod 7 in the same vertical lines as the points at which said elements are secured together, a piece 10 being interposed, if need be, between said laths 5 and elements 4, as shown in Figs. 3 and 5.

Fig. 4 is a perspective view of a detail of the assembling of two contiguous oblique braces 4 with the web 2a of the front spar.

It will be seen that each brace 4 is secured, on the one hand, to the flanged edge 2d, and on the other hand to the upper plane portion 2e of the web proper 2a of the spar.

The fixation is obtained by means of two gussets made of sheet iron. The upper gusset 12, to which brace 4 is secured by means of rivets 15 is fixed to the flanged edge 2d by means of rivets 16 and 17 located in parts of gusset 12 which are suitably slanted by stamping so as to provide for the eventual difference of inclination between flanged edge 2d and the upper plane face of brace 4. The lower gusset 13, which is also suitably shaped by stamping, is fixed to the flanged wings of brace 4 by means of rivets 14 and to part 2e of the web 2a of the spar by means of rivets 18.

While I have disclosed what I deem to be preferred embodiments of my invention, it should be well understood that I do not wish to be limited thereto as there might be changes made in the arrangement, disposition and form of the parts without departing from the principle of my invention as comprehended within the scope of the appended claims.

What I claim is:

1. An airplane wing structure of the type described comprising in combination, a main spar at right angles to the fore and aft direction of the airplane located in the part of the profile of the wing where the thickness thereof is maximum, two secondary spars parallel to the first mentioned one, one of said secondary spars forming the leading edge of the wing and the other one forming the rear edge of the fixed part of said wing, a plurality of bracing members forming a zig-zag latticing between the main spar and the first mentioned secondary spar, a plurality of bracing members forming a zig-zag latticing between the main spar and the second mentioned secondary spar, and a plurality of light members extending between said main spar and said secondary spars at right angles thereto, adapted to support the wing covering.

2. An airplane wing structure of the type described comprising in combination, a main spar located at a distance from the leading edge of the wing substantially equal to one third of the chord of said wing, and the vertical dimension of which is equal to the thickness of the wing at that point, two secondary spars parallel to the first mentioned one and at right angles to the fore and aft direction of the airplane, one of said secondary spars forming the leading edge of the wing and the other one forming the rear edge of the fixed part of said wing, a plurality of bracing members forming a zig-zag latticing between said main spar and the first mentioned secondary spar, a plurality of bracing members forming a zig-zag latticing between said main spar and the second mentioned secondary spar, and a plurality of light members extending between said main spar and said secondary spars at right angles thereto, adapted to support the wing covering.

3. An airplane wing structure of the type described comprising in combination, a main spar at right angles to the fore and aft direction of the airplane located in the part of the profile of the wing where the thickness thereof is maximum, said main spar having a vertical dimension which is equal to the thickness of the wing at that point, two secondary spars parallel to the first mentioned one, one of said secondary spars forming the leading edge of the wing and the other one forming the rear edge of the fixed part of said wing, a plurality of bracing members forming a zig-zag latticing between said main spar and the first mentioned secondary spar, a plurality of bracing members forming a zig-zag latticing between the main spar and the second mentioned secondary spar, each of said bracing members consisting of a plurality of rigid elements assembled in such manner as to form a trussed structure located in a vertical plane obliquely disposed with respect to said spars, said elements being disposed as close to the contour of the wing profile as it is possible, and a plurality of light members extending between said main spar and said secondary spars at right angles thereof, adapted to support the wing covering.

4. An airplane wing structure according to claim 3 in which the light members at right angles to said spars extend over and across said bracing members, such an arrangement being especially intended for the case of a flexible wing covering.

5. An airplane wing structure of the type described comprising in combination, a main spar at right angles to the fore and aft direction of the airplane located in the part of the profile of the wing where the thickness is maximum, said main spar having a vertical dimension which is equal to the thickness of the wing profile at that point, two secondary spars parallel to the first mentioned one, one of said secondary spars forming the leading edge of the wing and the other one forming the rear edge of the fixed part of said wing, a plurality of bracing members forming a zig-zag latticing between said main spar and the first mentioned secondary spar, a plurality of bracing members forming a zig-zag latticing between said main spar and the second mentioned secondary spar, each of said bracing members consisting of a plurality of rigid elements assembled in such a manner as to form a trussed structure located in a vertical plane, the outer elements of said structure conforming in shape with the external surface of the wing, and a plurality of light members at right angles to said spars secured to said outer elements of the trussed structure of the bracing members, whereby a covering of thin metal plates can be secured directly to said bracing members and to said light members.

6. An airplane wing structure according to claim 3 in which some of the bracing elements are reinforced so that external bracing members can be secured to at least one of the spars at points corresponding to said reinforced bracing members.

LOUIS BREGUET.